(12) United States Patent
Nandanwar

(10) Patent No.: US 12,153,924 B2
(45) Date of Patent: Nov. 26, 2024

(54) SYSTEM AND METHOD FOR PERFORMING ENERGY-EFFICIENT PROCESSING THROUGH REDUCED DATA MOVEMENT

(71) Applicant: QUALCOMM INCORPORATED, San Diego, CA (US)

(72) Inventor: Darshan Kumar Nandanwar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 18/171,012

(22) Filed: Feb. 17, 2023

(65) Prior Publication Data
US 2024/0281250 A1   Aug. 22, 2024

(51) Int. Cl.
*G06F 9/30* (2018.01)
(52) U.S. Cl.
CPC .................. *G06F 9/30043* (2013.01)
(58) Field of Classification Search
None
See application file for complete search history.

(56) References Cited

U.S. PATENT DOCUMENTS

| | | | | |
|---|---|---|---|---|
| 8,599,214 B1 * | 12/2013 | Dall | ......................... | H04N 1/64 345/589 |
| 11,102,313 B2 * | 8/2021 | Straub | ..................... | G06F 9/466 |
| 11,379,149 B2 * | 7/2022 | Kim | ......................... | G06F 7/57 |
| 11,625,251 B1 * | 4/2023 | Agrawal | ............... | G06F 9/3895 712/7 |
| 2014/0040532 A1 * | 2/2014 | Watanabe | ........... | G06F 13/1668 711/147 |
| 2022/0188117 A1 * | 6/2022 | Kalamatianos | ..... | G06F 9/30181 |
| 2023/0306553 A1 * | 9/2023 | Lavery | ............... | H04N 1/00031 |

OTHER PUBLICATIONS

Related PCT Pat. App. Ser. No. PCT/US2024/011289, Filed Jan. 11, 2024, entitled, "System and Method for Performing Energy-Efficient Processing Through Reduced Data Movement," International Search Report (ISR)(ISA = EPO), transmitted on May 8, 2024, 13 pages. PCT Pat. App. Publication No. WO 2024/172951A1.
Pattnaik Ashutosh et al.: "Scheduling techniques for GPU architectures with processing-in-memory capabilities," 2016 International Conference on Parallel Architechture and Compilation Techniques (PACT), ACM, Sep. 11, 2016, pp. 31-44 (14 pages); XP033013614—two (2) prior art references listed in ISR.

\* cited by examiner

*Primary Examiner* — Michael Sun
(74) *Attorney, Agent, or Firm* — Smith Tempel Blaha LLC/Qualcomm

(57) ABSTRACT

A system for performing energy-efficient computing reduces the amount of data that is transferred between a processor and an external memory device. The processor and the external memory device are equipped with first and second near data processing control units (NCUs), respectively, that coordinate offloading of preselected subprocesses from the processor to a first processing circuit disposed on or near the external memory device. When the processor is performing one of these preselected processes, the first NCU transmits commands and memory addresses to the second NCU. The processing circuit on or near the memory device performs the subprocess or subprocesses and the result is forwarded by the second NCU to the first NCU, which forwards it to the processor to complete the process.

27 Claims, 10 Drawing Sheets

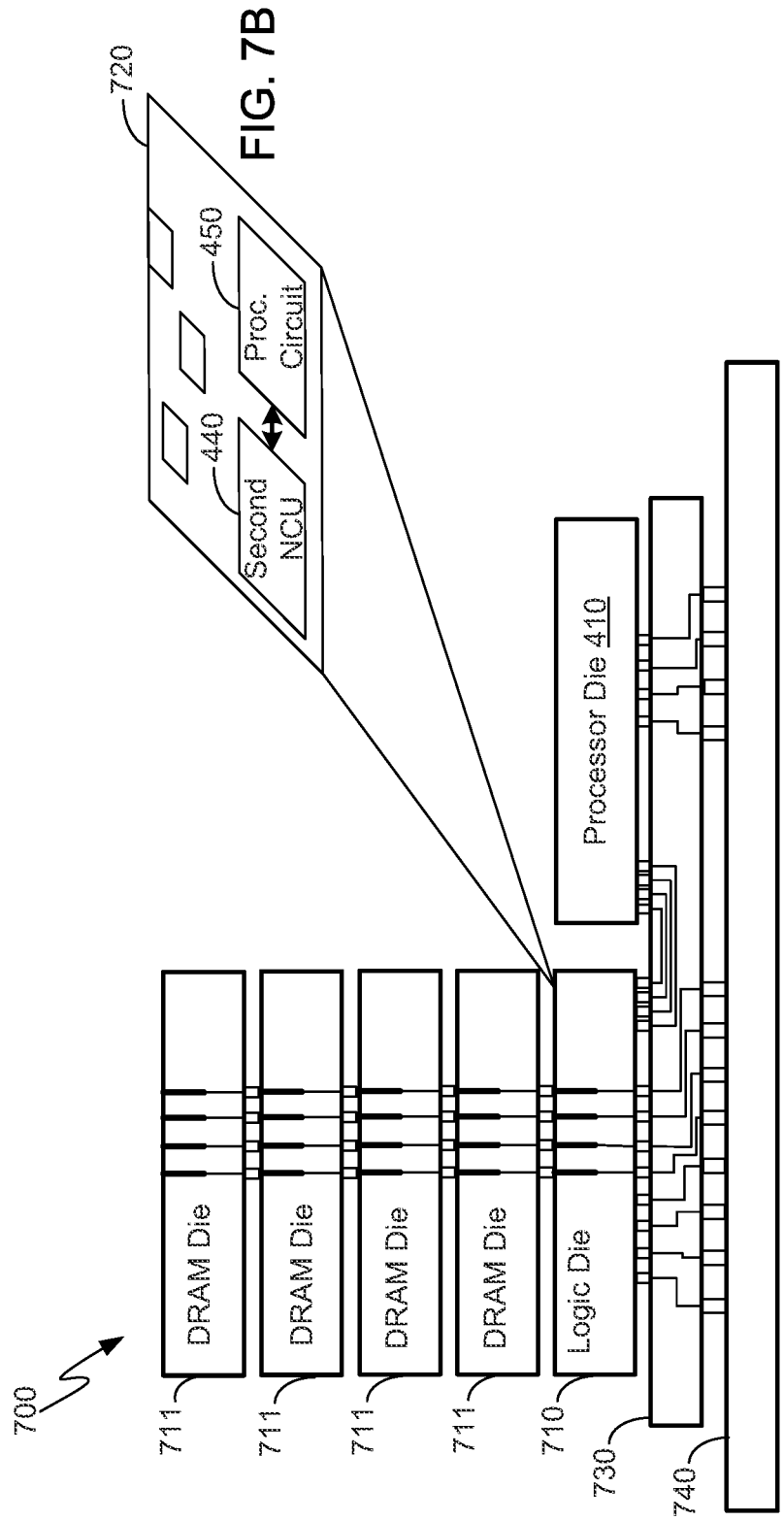

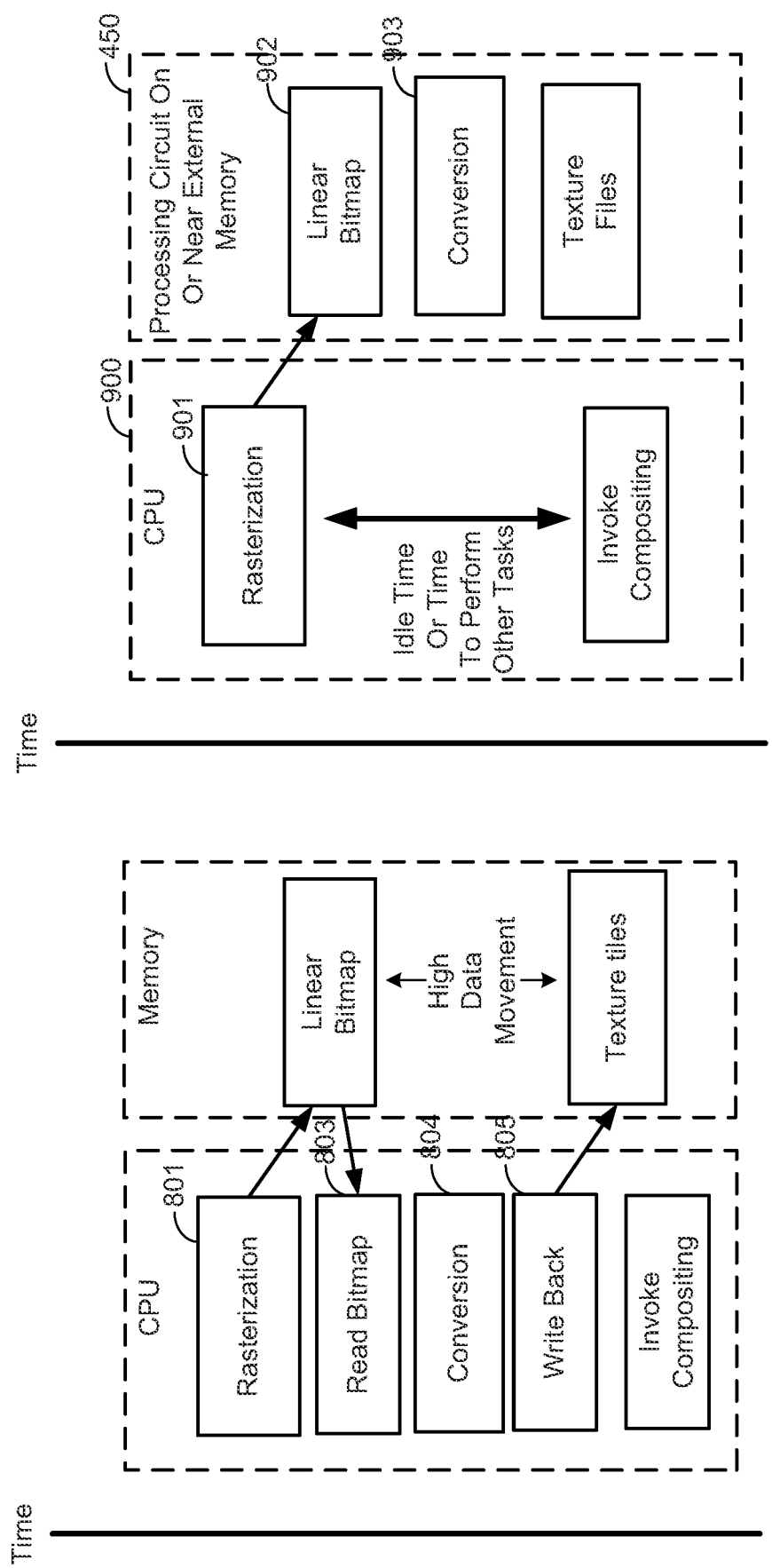

SYSTEM AND METHOD FOR PERFORMING ENERGY-EFFICIENT PROCESSING THROUGH REDUCED DATA MOVEMENT

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, portable digital assistant, portable game console, etc. Still other types of PCDs may be included in automotive and Internet-of-Things ("IoT") applications.

The multiple subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Processors of SoCs such as CPUs, GPUs and DSPs, for example, perform large amounts of computations that require large amounts of data to be written to and read from the main memory of the SoC by the processor. These transfers of data consumer large amounts of energy in the SoC. For these large workloads, a need exists for a way to reduce data movement in order to better conserve energy in energy-constrained systems.

SUMMARY OF THE DISCLOSURE

Systems, methods, and other examples are disclosed for performing energy-efficient computing by reducing data movement between a processor and a memory device that is external to the processor. The method may include, with a processor, starting a first process comprising at least a first subprocess. The method may further include, with a first near data processing control unit (NCU) of the processor, outputting at least a first processing command associated with performing the first subprocess and first addresses of where data associated with the first subprocess is stored in the memory device. The method may further include, with a second NCU disposed on or near the memory device, receiving the first processing command and the first addresses and causing the data stored at the first addresses to be read from the memory device and forwarded to a processing circuit disposed on or near the memory device. The method may further include, in the processing circuit, performing at least the first subprocess by performing at least the first processing command on the data read from the first memory addresses to produce a first result.

The system may include a processor comprising logic configured to start at least a first process comprising at least a first subprocess. The system may further include a memory device comprising memory addresses configured to store data. The system may further include a first NCU embedded in or in communication with the processor, the first NCU comprising logic being configured to receive at least a first processing command and first addresses from the processor. The first processing command may include one or more commands for performing the first subprocess. The first addresses are addresses of the memory device at which data to be processed by the first subprocess is stored. The system may further include a second NCU disposed on or near the memory device and in communication with the first NCU. The second NCU may include logic configured to receive the first addresses and the first commands from the first NCU. The system may further include a processing circuit disposed on or near the memory device comprising logic configured to receive the first commands and the first addresses from the second NCU and to read data from the first addresses and to perform the first commands on the data read from the first address to produce a first result.

A computer program of the present disclosure comprises computer instructions for performing energy-efficient computing by reducing data movement between a processor and a memory device that is external to the processor. The computer instructions are embodied in a non-transitory computer-readable medium and may include a first set of computer instructions for execution by a processor for starting a first process comprising at least a first subprocess, a second set of computer instructions for execution by a first NCU of the processor to cause the first NCU to output at least a first processing command for performing the first subprocess and first addresses of where data associated with the first subprocess is stored in the memory device. The computer program may further include a third set of computer instructions for execution by a second NCU disposed on or near the memory device to cause the second NCU to receive said at least a first processing command and the first addresses and to cause the data stored at the first addresses to be read from the memory device and forwarded to a processing circuit disposed on or near the memory device. The computer program can further include a fourth set of computer instructions for execution by the processing circuit to cause the processing circuit to perform said at least a first subprocess by executing said at least a first processing command on the data read from the first addresses to produce a first result.

Another embodiment of the system for performing energy-efficient computing by reducing data movement between a processor and a memory device that is external to the processor may include a processor configured to start a first process comprising at least a first subprocess, the processor comprising logic configured to output at least a first processing command associated with performing the first subprocess and first addresses of where data associated with the first subprocess is stored in the memory device. The system may further include a processing circuit embedded in the memory device and configured to receive the first processing command and the first addresses and to cause the data stored at the first addresses to be read from the memory device and forwarded to the processing circuit. The processing circuit may include logic configured to perform at least the first subprocess by performing at least the first processing command on the data read from the first memory addresses to produce a first result.

These and other features and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101*a*" or "101*b*", the letter character designations may differentiate two like parts or elements present in the same Figure. Letter character designations for reference numerals may be omitted when it is intended that a reference numeral to encompass all parts having the same reference numeral in all Figures.

FIG. 7A is a schematic diagram of a 3D-stacked DRAM memory system that has been modified to include the second NCU and the first processing circuit shown in FIG. 4 in the vault logic of the logic die of the memory system.

FIG. 7B is a block diagram of the vault logic shown in FIG. 7A having the second NCU and the first processing circuit shown in FIG. 4 embedded in it.

FIG. 8 is a flow diagram of a texture filing process as currently performed by a CPU.

FIG. 9 is a flow diagram of a texture filing process shown in FIG. 8 in accordance with a representative embodiment of the present disclosure.

DETAILED DESCRIPTION

The end of Dennard scaling has made computing systems energy-constrained and has widened the gap between computational speed and data transfer speed, commonly referred to as memory-wall. For data-intensive applications with limited temporal locality, the major energy bottleneck in processing throughput is data movement between processor and main memory.

Figure 1:
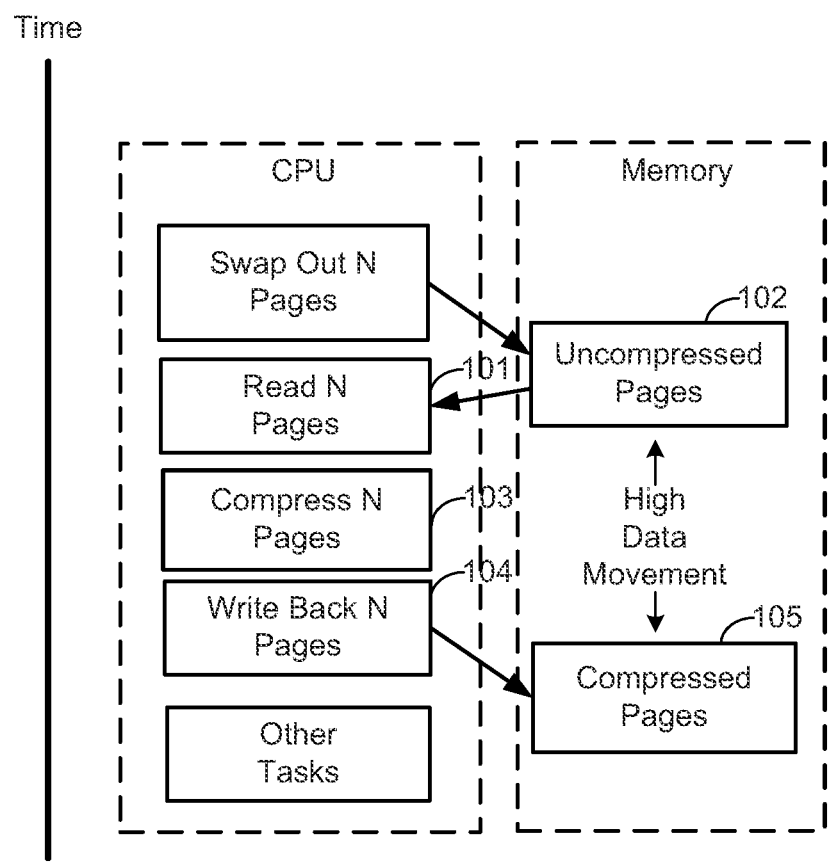
FIG. 1 is a block diagram of an Internet browser tab switching process that shows the subprocesses that make up the tab switching process performed in a CPU executing the Google Chrome browser.

FIG. 1 is a block diagram of an Internet browser tab switching process that shows the subprocesses that make up the tab switching process being performed in a CPU of a PCD. The first subprocess 101 performed by the CPU retrieves N uncompressed pages 102 from a main memory that is external to the CPU, where N is a positive integer corresponding to the number of pages to be swapped. The second subprocess 103 performed by the CPU compresses the retrieved pages. The third subprocess 104 performed by the CPU writes the compressed pages 105 to main memory.

Figure 2:
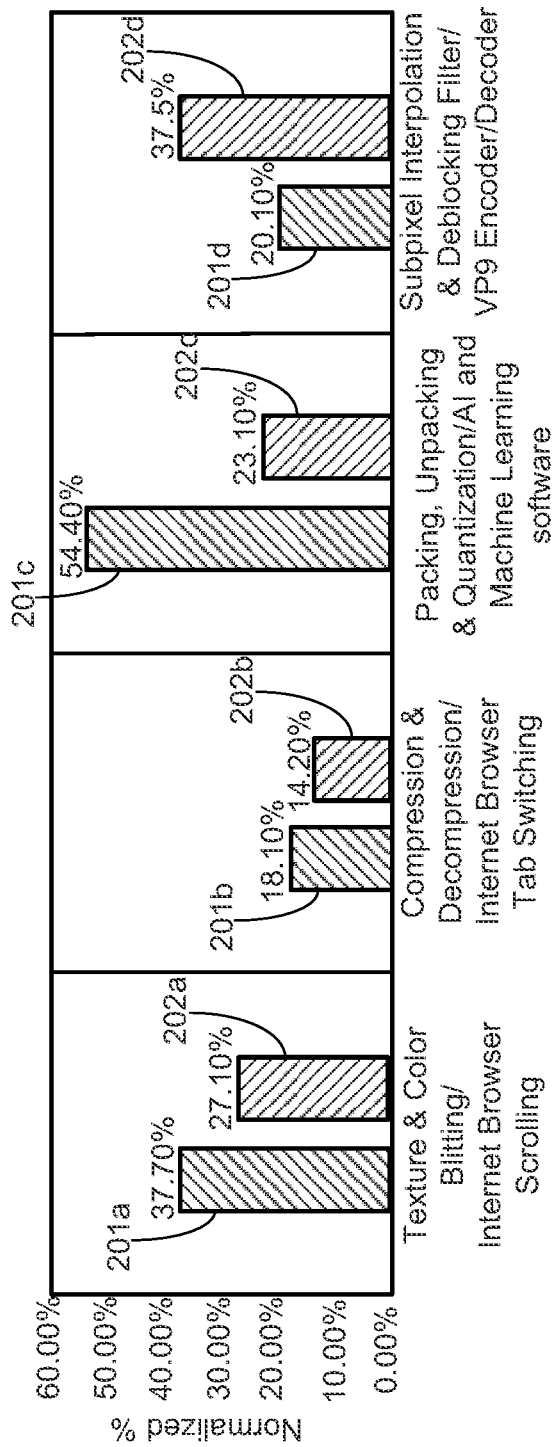
FIG. 2 is a graph showing percentages of energy consumed through data movement between a CPU and memory and the energy consumed by computing for four different processes namely, (1) texture and color blitting when scrolling using Google Chrome, (2) compression and decompression when tab switching using Google Chrome, (3) packing, unpacking and quantization when using TensorFlow artificial intelligence (AI) machine learning software, and (4) subpixel interpolation and deblocking filtering when using a VP9 Encoder/Decoder.

A study of very common Internet browser workloads executed on SoCs used in current PCDs revealed that a large percentage of energy consumption is due to data movement between the CPU and memory. FIG. 2 is a graph showing percentages of energy consumed through data movement between the processor and memory and energy consumed by computing for four different processes namely, (1) texture and color blitting when scrolling using an Internet browser, (2) compression and decompression when tab switching using the Internet browser, (3) packing, unpacking and quantization when using artificial intelligence (AI) machine learning software, and (4) subpixel interpolation and deblocking filtering when using a VP9 Encoder/Decoder.

The bars $201a$-$201d$ represent the percentage of energy consumed due to data movement for the respective processes and the bars $202a$-$202d$ represent the energy consumed due to computations performed by the respective processes. All of these processes perform their respective computations using relatively simple operations, such as shifting, addition and multiplication. It can be seen from the graph that the percentage of energy consumed due to data movement compared to the percentage of energy consumed due to computations is very high, and in some cases exceeds it. For data-intensive applications such as deep neural network and graph processing applications where no or very little temporal locality is present in the data, energy consumed due to data movement is a major bottleneck to achieving performance per milliwatt (mW).

The present disclosure provides a solution for achieving energy-efficient computing by reducing the amount of data that is transferred between a processor and a memory device that is external to the processor. To accomplish this, the processor is equipped with a first near data processing control unit (NCUs). A processing circuit and a second NCU are disposed on or near the external memory device. The first and second NCUs coordinate the offloading of preselected subprocesses from the processor to the processing circuit disposed on or near the external memory device. When the processor is performing one of these preselected processes comprising multiple subprocesses, the first NCU of the processor transmits commands to the second NCU of the memory device that inform a processing circuit that is in or near the memory device of the manner in which the subprocess is to be performed. The first NCU also sends to the second NCU the memory addresses of where the data to be processed in the subprocess is stored in the memory device. The processing circuit disposed on or near the memory device performs the subprocess or subprocesses and then the second NCU forwards the result of the subprocess or subprocesses to the first NCU, which then forwards the result to the processor. The processor then uses the result to complete the process.

Thus, much of the data movement between the processor and the memory device to perform the process has been eliminated, while at the same time, the processor has been freed up to perform other tasks while the processing circuit performs the subprocess or subprocesses.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "external memory device", as that term is used herein, is intended to denote a non-transitory computer-readable storage medium that is external to the processor as opposed to a memory device or structure that is embedded in a processor, and that is capable of storing computer instructions, or computer code, for execution by one or more processors. References herein to a "memory device" or an "external memory device" should be interpreted as including the memory controller, the memory banks and associated elements interposed in between the memory controller and the memory banks, such as, for example, the associated physical layer, the associated memory channel, and the associated memory rank.

A "processor", as that term is used herein encompasses an electronic component that is able to execute a computer program or executable computer instructions. References herein to a computer comprising "a processor" should be interpreted as one or more processors. The processor may for instance be a multi-core processor comprising multiple processing cores, each may comprise multiple processing stages of a processing pipeline. A processor may also refer to a collection of processors within a single computer system or distributed amongst multiple computer systems.

A computing device may include multiple subsystems, cores or other components. Such a computing device may be, for example, a PCD, such as a laptop or palmtop computer, a cellular telephone or smartphone, a portable digital assistant, a portable game console, an automotive safety system of an autonomous driving vehicle, etc.

References herein to the processing circuit and the second NCU being disposed "near" the external memory device means that the processing circuit and the second NCU are physically located a shorter distance from the memory device than they are from the processor (e.g., the CPU, GPU, etc.) and that processing circuit and the second NCU are disposed somewhere in between the interconnects that interconnect the processor with system cache and the memory banks of the external memory device. For example, in the case where the processor is a CPU and the external memory device is a dynamic random access memory (DRAM) memory device, the processing circuit and the second NCU can be disposed in the system cache controller, which is in between the aforementioned interconnects and the DRAM banks in the memory hierarchy:
CPU-->Interconnect-->System Caches and Cache Controller (second NCU+processing circuit)-->DRAM/HBM Controller-->PHY-->DRAM Channel-->DRAM Rank-->DRAM Bank.

References made herein to the second NCU and the processing circuit being disposed "on" the external memory device means that the processing circuit and the second NCU are disposed (1) in the memory controller of the external memory device, (2) in the memory banks of the external memory device, or (3) at some location in between the memory controller and the memory banks (e.g., in the associated physical layer, in the associated memory channel, in the associated memory rank, or anywhere in between).

For example, in the case where the processor is a CPU and the external memory device is a DRAM memory device, the processing circuit and the second NCU can be disposed in the DRAM memory controller: CPU-->Interconnect-->System Caches and Cache Controller-->DRAM Controller (second NCU+processing circuit)-->PHY-->DRAM Channel-->DRAM Rank-->DRAM Bank.

Figure 3:
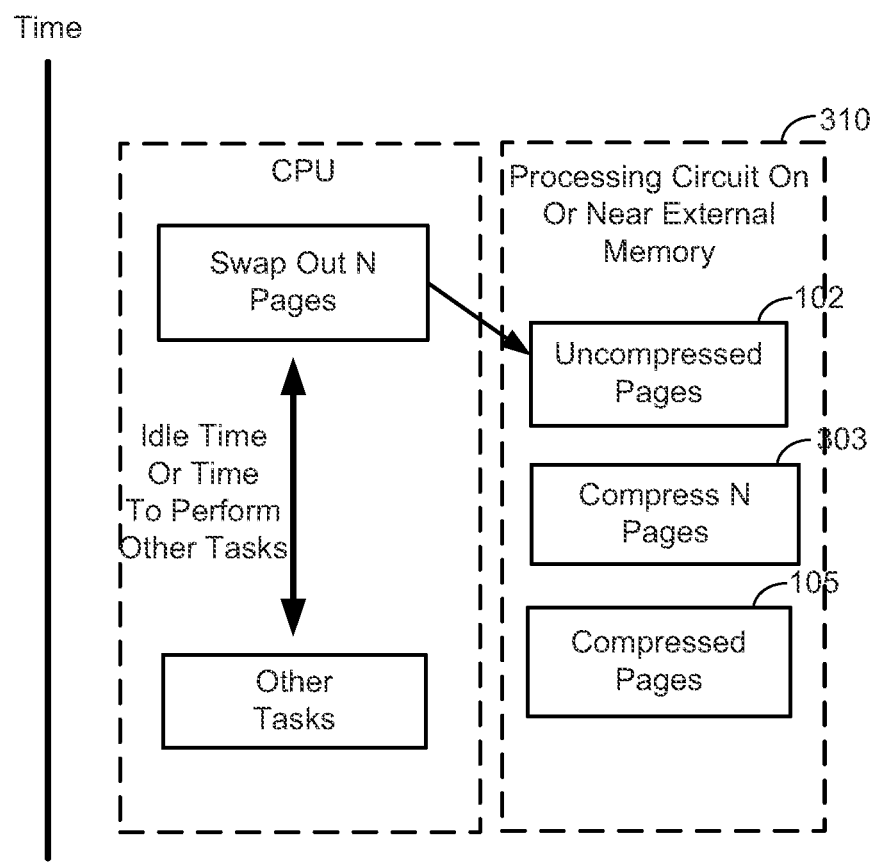
FIG. 3 is a block diagram of the tab switching process shown in FIG. 1 modified to eliminate the reading and writing processes represented by blocks 102 and 104, respectively, of FIG. 1 and to offload the compression subprocess represented by block 103 of FIG. 1 to a processing circuit disposed on or near a memory device.

FIG. 3 is a block diagram of the tab switching process shown in FIG. 1 modified to eliminate the reading and writing processes 101 and 104, respectively, and to offload the compression subprocess 103 to the processing circuit 310 disposed on or near the memory device. The compression subprocess 103 performed by the CPU in FIG. 1 has been replaced in FIG. 3 by the compression subprocess 303 performed by the processing circuit 310. Because the processing circuit 310 is disposed in or near memory, data movement between the processing circuit 310 and memory as well as the energy consumed by it are negligible. In addition, it can be seen that the CPU processor is idle during the time that it previously was occupied performing the read, write and compression subprocesses 101, 104 and 103, respectively, thereby freeing up the CPU to perform other tasks.

It should be noted that while a CPU is shown in FIG. 3 as the processor from which subprocesses are offloaded, it could be any processor, including, for example, a GPU, a DSP, an NPU, or any other processor that may access an external memory device.

Figure 4:
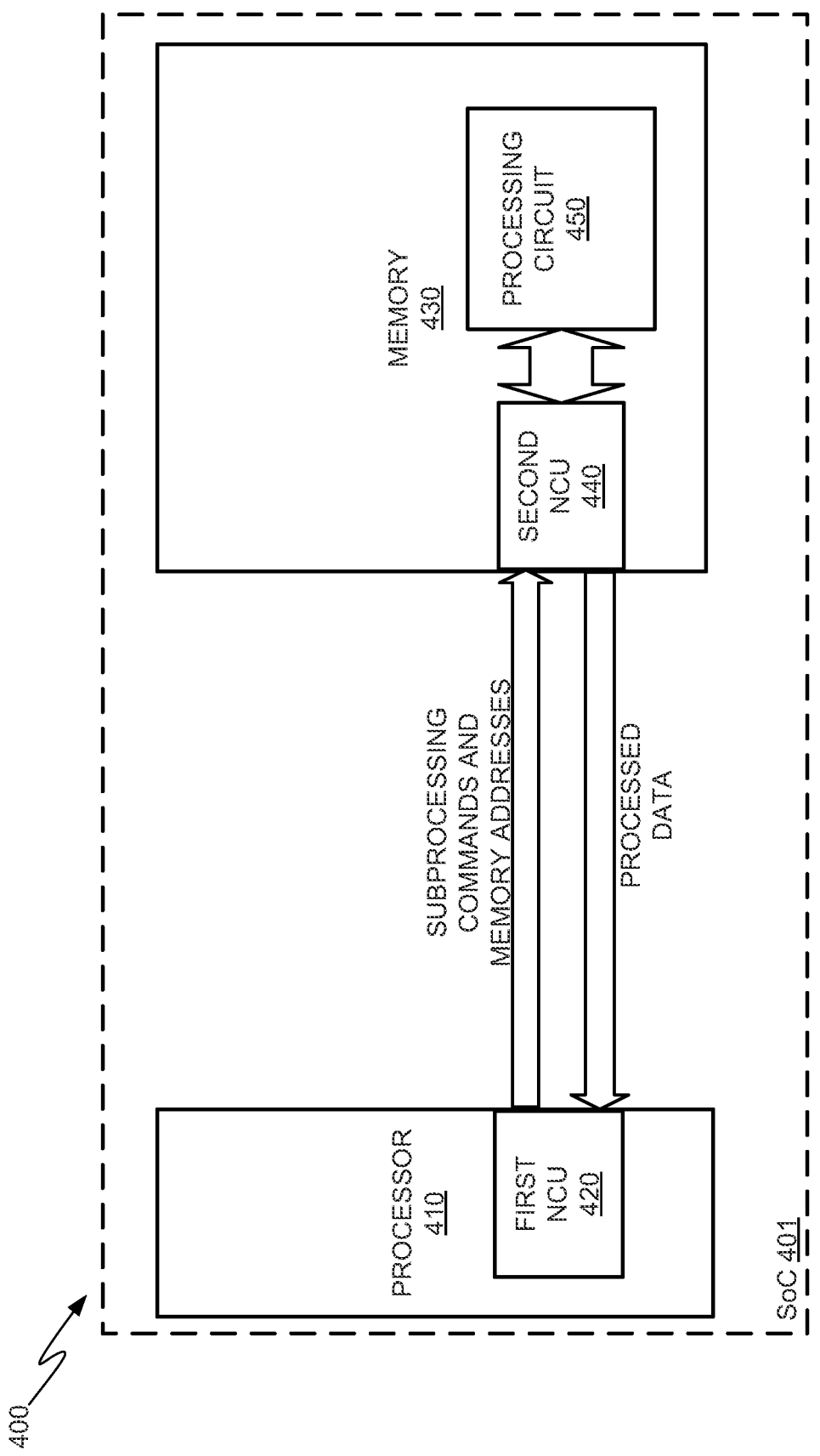
FIG. 4 is a block diagram of the system for performing energy-efficient computing by reducing data movement between the processor and memory in accordance with a representative embodiment.

FIG. 4 is a block diagram of the system 400 for performing energy-efficient computing by reducing data movement between the processor 410 and external memory 430 in accordance with an exemplary embodiment. The system 400 may be employed in, for example, an SoC package that is used in PCDs, although the inventive principles and concepts are not limited with respect to the type of system in which they are employed. For exemplary purposes, the system and method of the present disclosure are described as being implemented in an SoC package 401.

The processor 410 and the external memory device 430 are equipped with first and second NCUs 420 and 440, respectively, that coordinate the offloading of preselected subprocesses from the processor 410 to a processing circuit 450 disposed on or near the external memory device 430. For exemplary purposes, the second NCU 440 and the processing circuit 450 are shown embedded in the memory device 430, but one or both of the NCU 440 and the processing circuit 450 could instead be external to and very close to the memory device 430 and to one another. The processing circuit 450 is in communication with the memory device 430 via a suitable interface for high-speed data transfer. Likewise, the processing circuit 450 is in communication with the second NCU 440 via a suitable interface.

When the processor 410 is performing one of these preselected processes comprising multiple subprocesses, the first NCU 420 of the processor 410 transmits commands to the second NCU 440 of the memory device 430 that the processing circuit 450 will use to perform the subprocess or subprocesses that are being offloaded from the processor 410 to the processing circuit 450. The first NCU 420 also sends to the second NCU 440 the memory addresses of where the data to be processed by the subprocess is stored in the memory device 430. The processing circuit 450 retrieves the data from the memory addresses and performs the subprocess or subprocesses to produce a result. In some cases, the result(s) may be stored by the processing circuit 450 in the memory device 430. For example, for the process depicted in FIG. 3, the processing circuit 310 writes the compressed pages to memory. In cases where further processing of the result by the processor 410 is needed, the second NCU 440 forwards the result(s) of the subprocess or subprocesses to the first NCU 420, which then forwards the result(s) to the processor 410. The processor 410 then uses the result(s) to complete the overall process.

As indicated above, the processor 410 can be any processor, such as, for example, a CPU, a GPU, a DSP, an NPU, etc. The memory device 430 can be any memory device, but typically is main memory and is typically a DRAM device, although it could be any type of memory device.

Figure 5:
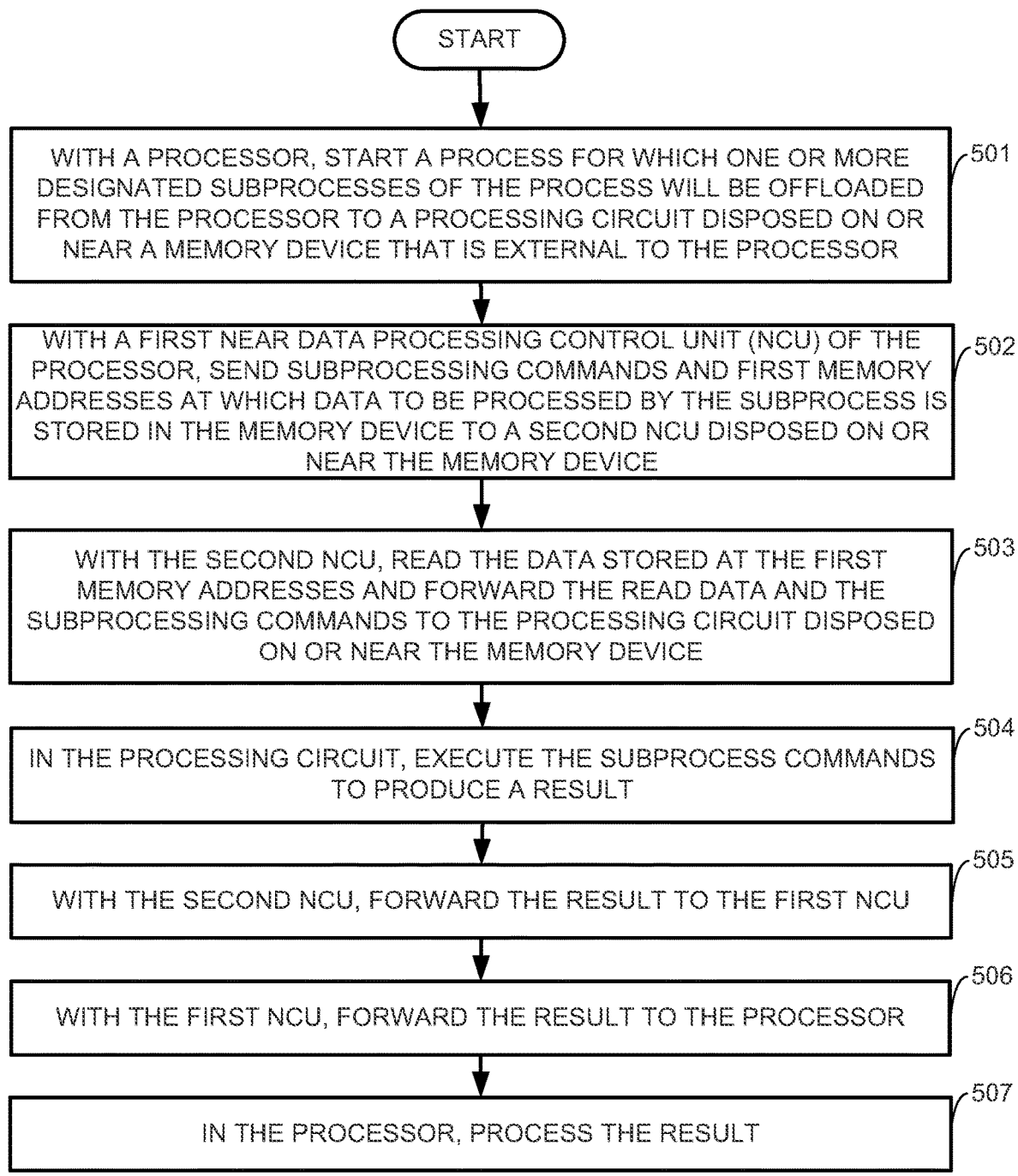
FIG. 5 is a flow diagram of the method for energy-efficient computing by reducing the amount of data that is transferred between a processor and an external memory device in accordance with a representative embodiment.

FIG. 5 is a flow diagram of the method in accordance with an exemplary embodiment for energy-efficient computing by reducing the amount of data that is transferred between a processor and an external memory device. In accordance with this embodiment, the result(s) produced by the processing circuit is forwarded by the second NCU to the first NCU, which forwards the result(s) to the processor for further processing. A processor starts a process for which one or more preselected subprocesses will be offloaded to a processing circuit that is at or near the external memory device, as indicated by block 501. The first subprocess of the process can be one that the processor will perform or one that is designated to be offloaded to the processing circuit disposed on or near the memory device. For ease of discussion, it will be assumed that the first subprocess is to be offloaded and performed by the processing circuit disposed on or near the memory device.

A first NCU of the processor sends subprocess processing commands and first memory addresses at which data to be processed by the first subprocess is stored to the second NCU disposed on or near the external memory device, as indicated by block 502. The second NCU reads the data stored at the first memory addresses of the memory device and forwards the read data and the commands received from the first NCU to a processing circuit disposed on or near the memory device, as indicated by block 503. The processing circuit performs the designated subprocess or subprocesses on the read data to produce a result, as indicated by block 504. The second NCU sends the result to the first NCU, as indicated by block 505, which forwards the result to the processor, as indicated by block 506. The processor processes the result, as indicated by block 507.

As indicated above, the processor may perform additional subprocesses or tasks that utilize the result produced by the processing circuit disposed on or near the memory device. The processor may be performing one or more other related subprocesses to achieve other results. The result received in the first NCU from the second NCU may or may not be used by the processor with results of other related subprocesses performed by the processor.

Figure 6:
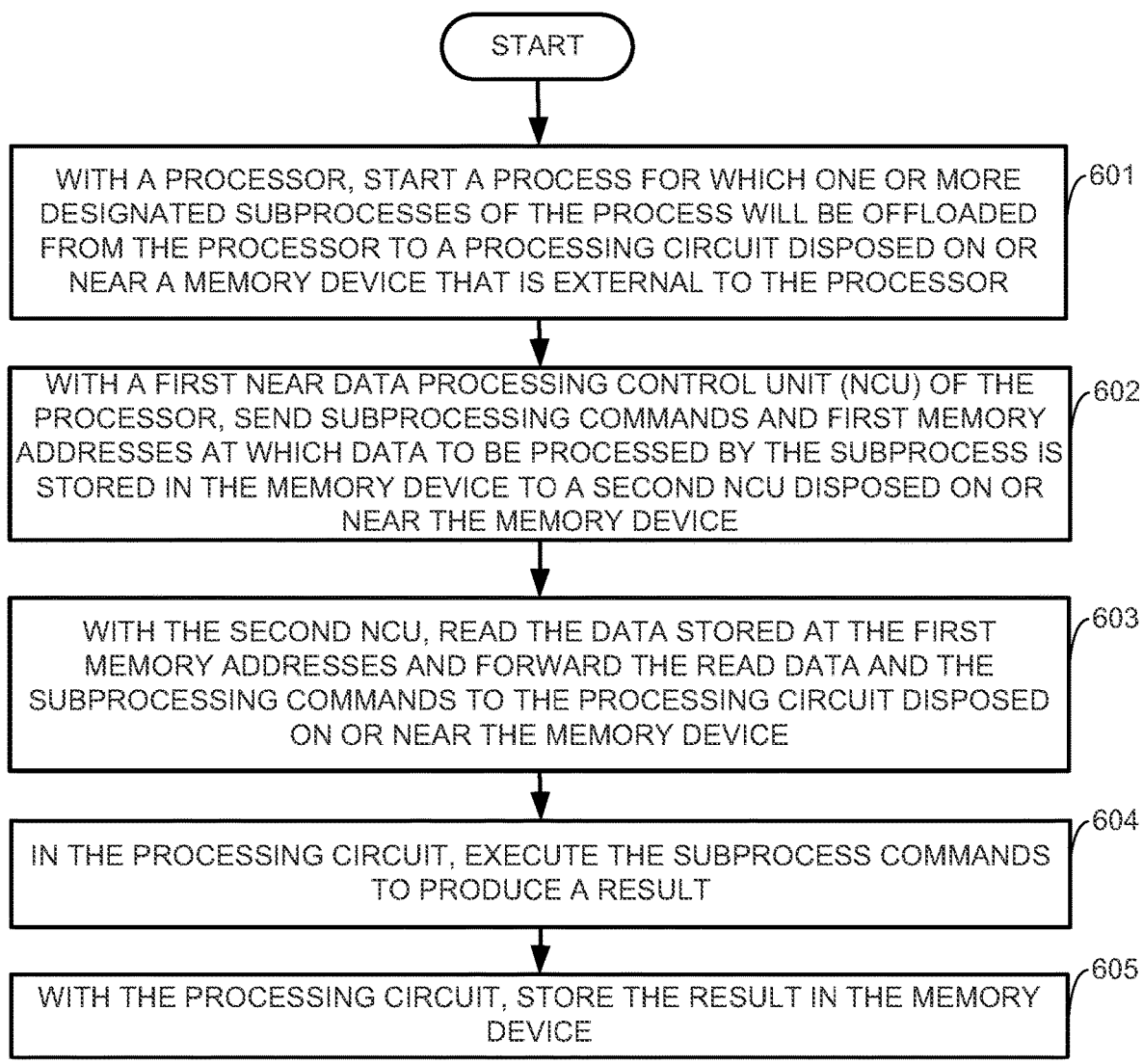
FIG. 6 is a flow diagram of the method for energy-efficient computing by reducing the amount of data that is transferred between a processor and an external memory device in accordance with a representative embodiment.

FIG. 6 is a flow diagram of the method in accordance with another exemplary embodiment for energy-efficient computing by reducing the amount of data that is transferred between a processor and an external memory device. In accordance with this embodiment, the result(s) produced by the processing circuit is not forwarded by the second NCU to the first NCU, but is stored by the processing circuit in memory. In accordance with this embodiment, further processing of the result(s) by the processor is not needed, and therefore the processing circuit stores the result(s) in memory.

A processor starts a process for which one or more preselected subprocesses will be offloaded to a processing circuit that is at or near the external memory device, as indicated by block 601. The first subprocess of the process can be one that the processor will perform or one that is designated to be offloaded to the processing circuit disposed on or near the memory device. For ease of discussion, it will be assumed that the first subprocess is to be offloaded and performed by the processing circuit disposed on or near the memory device.

A first NCU of the processor sends subprocess processing commands and first memory addresses at which data to be processed by the first subprocess is stored to the second NCU disposed on or near the external memory device, as indicated by block 602. The second NCU reads the data stored at the first memory addresses of the memory device and forwards the read data and the commands received from the first NCU to a processing circuit disposed on or near the memory device, as indicated by block 603. The processing circuit performs the designated subprocess or subprocesses on the read data to produce a result, as indicated by block 604. The processing circuit then stores the result in the external memory device, as indicated by block 605.

With reference again to FIG. 4, each of the NCUs 420 and 440 can be, for example, a hardware unit configured to execute near data processing (NDP)-enable instructions (NEIs). Each of the NCUs 420 and 440 can comprise, for example, computation logic and an operand buffer. The operand buffer can be, for example, a small static random access memory (SRAM) buffer that stores the command(s) and the addresses in memory where the data to be processed is located. Its main purpose is to achieve instruction level parallelism. In order to use NCUs in this solution, ISA extensions in host processor 410 can be used to identify subprocesses that are designated for offloading to the first processing circuit 450 disposed on or near memory 430.

It is important to note the difference between the systems and methods of the present disclosure and the known utilization of compute caches. Compute caches are conduits that use the temporal locality of data patterns. The data needs to be brought back into the caches before compute pipeline stages perform a load/store, which is an expensive off-chip data movement, especially if multiple cache lines need to be fetched or if data prefetches happen speculatively. If there are workloads that do not have temporal locality, such as with matrix multiplication, for example, processing them using compute caches will require a large number of cache accesses, which wastes energy in data movement: total energy cost=off chip data movement energy cost+computation energy cost.

The solution of the present disclosure brings the computations to memory or near memory, which is the opposite the compute cache concept, and is well suited for cases where the data to be processed has very little or no temporal locality.

The second NCU 440 and the first processing circuit 450 can be placed, for example, in the logic vault of a 3D-stacked DRAM memory system, as will now be described with reference to FIGS. 7A and 7B. FIG. 7A is a schematic diagram of a 3D-stacked DRAM memory device 700 that has the second NCU 440 and the processing circuit 450 shown in FIG. 4 embedded in a vault logic 720 of a logic die 710 of the DRAM memory device 700. FIG. 7B is a block diagram of the vault logic 720 having the second NCU 440 and the processing circuit 450 shown in FIG. 4 embedded in it. Because of the proximity of the vault logic 720 to the banks of the DRAM dies 711 in which the data to be processed by the subprocess is stored, data movement between the DRAM dies 711 and the processing circuit 450 disposed in the vault logic 720, and the energy cost associated with writing to and reading from memory, is negligible.

In the exemplary embodiment shown in FIG. 7A, a first interface device 730 of an SoC mounted on a second interface device 740 of the SoC is used to interface the DRAM memory device 700 with the processor die 410 and to interface both components with other components of the SoC (not shown). However, the inventive principles and concepts are not limited to this configuration. All of the components shown in FIG. 7A can be, for example, integrated into the same SoC package and formed in layers of the SoC package that are interconnected by vias, traces and other electrical routing of the SoC.

It should be noted that the second NCU 440 and the processing circuit 450 can be located at any suitable location on or near the external memory device. In 3D memory devices of the type shown in FIGS. 7A and 7B, preferably the second NCU 440 and the processing circuit 450 will be disposed in a logic die of the external memory device or at some other location along the route between the logic die and the memory banks. As indicated above the processing circuit 450 can be implemented in relatively simple logic, such as a adders and multipliers, for example, which will not consume a large amount of space, and therefore is well suited for implementation in a logic die of a memory device. For planar memory devices, the processing circuit 450 can be implemented in processor-in-memory (PIM) compute logic of the external memory device and can be integrated per bank group to take advantage of bank level parallelism.

FIG. 8 is a flow diagram of a texture filing process as currently performed by a CPU. The process of texture tiling is a major source of data movement between the CPU and main memory and utilizes a large rasterized bitmap (e.g., 4 megabytes (Mb)). In addition, the data processed during the process has poor temporal locality, which means that the process will not benefit greatly from using cache memory for reducing transfers between the CPU and main memory.

The process begins with a rasterization subprocess 801 that generates a linear bitmap and writes it to memory. The CPU performs subprocesses of reading the linear bitmap from memory 803, converting the linear bitmap into texture tiles 804 and writing the texture tiles to memory 805.

FIG. 9 is a flow diagram of a texture filing process in accordance with a representative embodiment of the present disclosure in which the subprocesses of generating the linear bitmap 902 and of converting the linear bitmap into texture tiles 903 are performed by the combined actions of the second NCU 440 and the processing circuit 450 disposed on or near memory. For ease of illustration, the second NCU 440 is not shown in FIG. 9. The processor 410 shown in FIG. 4 is represented in FIG. 9 by the CPU 900. The CPU 900 performs the rasterization subprocess 901 that generates the linear bitmap and the second NCU 440 writes it to memory. The subprocesses of generating the linear bitmap 902 and of converting the linear bitmap into texture tiles 903 are performed by the processing circuit 450. Because the second NCU 440 and the processing circuit 450 are disposed on or near memory, there is negligible data movement in writing and reading the linear bitmap to and from memory and writing the texture files to memory. Also, a large amount of logic is not needed to implement the second NCU 440 and the processing circuit 450 because the texture tiling operations are relatively simple operation that require simple primitive processing, e.g., memcopy operations, bitwise operations and simple arithmetic operations.

Figures 10, 11:
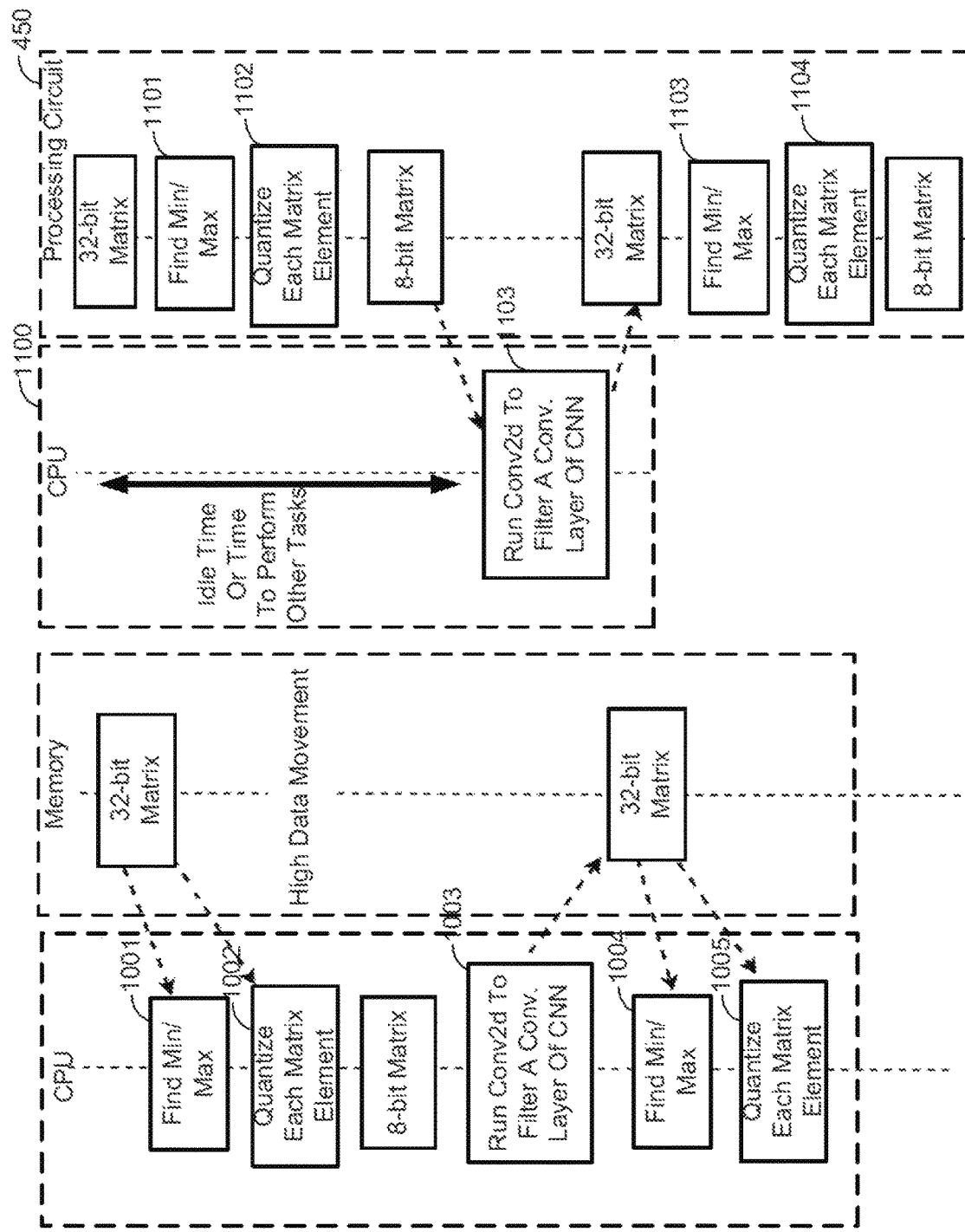
FIG. 10 is a flow diagram of a TensorFlow packing and quantization process as currently performed by a CPU.
FIG. 11 is a flow diagram of the TensorFlow process shown in FIG. 10 modified in accordance with a representative embodiment of the present disclosure.

FIG. 10 is a flow diagram of a packing/unpacking and quantization process as currently performed by a CPU. This process is a major source of data movement between the CPU and main memory and utilizes large amounts of data having poor temporal locality. The process performed by the CPU comprises the subprocesses of reading a 32-bit matrix from memory and finding the minimum and maximum values of the matrix 1001, using the minimum and maximum values to quantize each matrix value to produce an 8-bit matrix 1002, performing convolution on the 8-bit matrix to produce a 32-bit result matrix and writing the result matrix to memory 1003, and then re-quantizing the result matrix by reading the 32-bit result matrix from memory, finding the minimum and maximum matrix element values 1004 and using the minimum and maximum values 1005 to produce an 8-bit matrix.

FIG. 11 is a flow diagram of the process shown in FIG. 9 modified in accordance with a representative embodiment of the present disclosure to perform the subprocesses of blocks 1001 and 1002 of FIG. 10 as blocks 1101 and 1102, respectively, in FIG. 11 by the combined actions of the second NCU 440 (not shown for ease of illustration) and the first processing circuit 450 disposed on or near memory. Likewise, the subprocesses of blocks 1004 and 1005 of FIG. 10 are performed as blocks 1103 and 1104, respectively, in FIG. 11 by the combined actions of the second NCU 440 and the processing circuit 450 disposed on or near memory. To avoid having to employ complex logic in the processing circuit 450, the convolution subprocess 1103 can continue to be performed by the CPU 1100 since it is a more processing-intensive subprocess than the other subprocesses.

Thus, the subprocesses represented by blocks 1101-1104 of FIG. 11 have all been offloaded from the CPU 1100 to the processing circuit 450. This greatly reduces data movement between the CPU 1100 and external memory and the amount of energy that would otherwise be consumed by due to data movement, while also freeing up the CPU 1100 to perform other tasks.

It should be noted that the subprocesses shown in FIGS. 3, 9 and 11 that are offloaded to be performed on or near memory are only examples of subprocesses that are suitable for offloading due to poor temporal locality of the data used in these processes and also due to their operations being relatively simple operations that can be performed in relatively simple logic that does not consume a large amount of die area.

Figure 12:
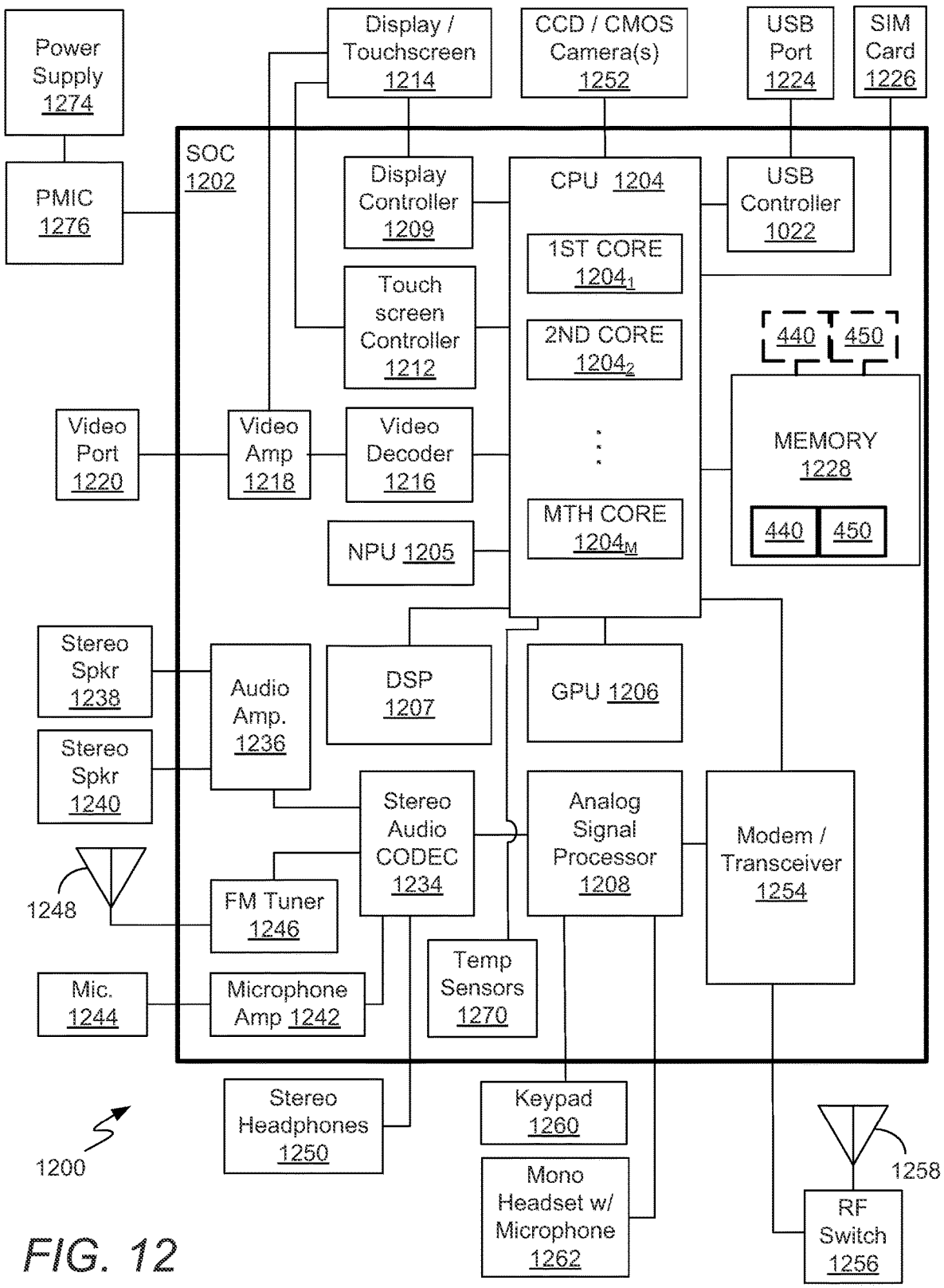
FIG. 12 illustrates an example of a PCD in which exemplary embodiments of systems, methods, computer-readable media, and other examples of providing energy-efficient processing with reduced data movement according to the inventive principles and concepts may be implemented.

FIG. 12 illustrates an example of a PCD 1200, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of providing energy-efficient processing with reduced data movement according to the inventive principles and concepts may be implemented. For purposes of clarity, some interconnects, signals, etc., are not shown in FIG. 12.

The PCD 1200 may include an SoC 1202. The SoC 1002 may include a CPU 1204, an NPU 1205, a GPU 1206, a DSP 1207, an analog signal processor 1208, a modem/modem subsystem 1254, or other processors. The CPU 1204 may include one or more CPU cores, such as a first CPU core $1204_1$, a second CPU core $1204_2$, etc., through an $M^{th}$ CPU core $1204_M$.

A display controller 1209 and a touch-screen controller 1212 may be coupled to the CPU 1204. A touchscreen display 1214 external to the SoC 1202 may be coupled to the display controller 1210 and the touch-screen controller 1212. The PCD 1200 may further include a video decoder 1216 coupled to the CPU 1204. A video amplifier 1218 may be coupled to the video decoder 1216 and the touchscreen display 1214. A video port 1220 may be coupled to the video amplifier 1218. A universal serial bus ("USB") controller 1222 may also be coupled to CPU 1204, and a USB port 1224 may be coupled to the USB controller 1222. A subscriber identity module ("SIM") card 1226 may also be coupled to the CPU 1204.

One or more memories 1228 may be coupled to the CPU 1204. The one or more memories 1228 may include both volatile and non-volatile memories. Examples of volatile memories include static random access memory ("SRAM") and dynamic random access memory ("DRAM"). Such memories may be external to the SoC 1202 or internal to the SoC 1202. The one or more memories 1228 may include local cache memory or a system-level cache memory. The second NCU 440 and the processing circuit 450 can be disposed on or near the one or more memories 1228.

A stereo audio CODEC 1234 may be coupled to the analog signal processor 1208. Further, an audio amplifier 1236 may be coupled to the stereo audio CODEC 1234. First and second stereo speakers 1238 and 1240, respectively, may be coupled to the audio amplifier 1236. In addition, a microphone amplifier 1242 may be coupled to the stereo audio CODEC 1234, and a microphone 1244 may be coupled to the microphone amplifier 1242. A frequency modulation ("FM") radio tuner 1246 may be coupled to the stereo audio CODEC 1234. An FM antenna 1248 may be coupled to the FM radio tuner 1246. Further, stereo headphones 1250 may be coupled to the stereo audio CODEC 1234. Other devices that may be coupled to the CPU 1204 include one or more digital (e.g., CCD or CMOS) cameras 1252.

A modem or RF transceiver 1254 may be coupled to the analog signal processor 1208 and the CPU 1204. An RF switch 1256 may be coupled to the RF transceiver 1254 and an RF antenna 1258. In addition, a keypad 1260 and a mono headset with a microphone 1262 may be coupled to the analog signal processor 1208. The SoC 1202 may have one or more internal or on-chip thermal sensors 1270. A power supply 1274 and a PMIC 1276 may supply power to the SoC 1202.

Firmware or software may be stored in any of the above-described memories, or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses:

1. A method for performing energy-efficient computing by reducing data movement between a processor and a memory device that is external to the processor, the method comprising:
   with a processor, starting a first process comprising at least a first subprocess;
   with a first near data processing control unit (NCU) of the processor, outputting at least a first processing command associated with performing the first subprocess and first addresses of where data associated with the first subprocess is stored in the memory device;
   with a second NCU disposed on or near the memory device, receiving the first processing command and the first addresses and causing the data stored at the first addresses to be read from the memory device and forwarded to a processing circuit disposed on or near the memory device; and
   in the processing circuit, performing said at least a first subprocess by performing said at least a first processing command on the data read from the first memory addresses to produce a first result.

2. The method of clause 1, further comprising:
   with the processing circuit, storing the first result in the memory device.

3. The method of clause 1, further comprising:
   with the second NCU, sending the first result to the first NCU;
   with the first NCU, forwarding the first result to the processor; and
   in the processor, processing the first result.

4. The method of any of clauses 1-3, wherein the first process comprises a tab switching process and said at least a first subprocess comprises a compression subprocess that compresses the data read from the first addresses to produce the first result.

5. The method of any of clauses 1-3, wherein the first process comprises a texture tiling process and said at least a first subprocess comprises a linear bitmap generation subprocess and a conversion subprocess, the linear bitmap generation process processing the data read from the first addresses to produce a linear bitmap and the conversion subprocess processing the linear bitmap to convert the linear bitmap into texture tiles.

6. The method of clause 3, wherein the first process comprises a quantization and packing process and said at least a first subprocess comprises at least a first quantization subprocess, said at least a first quantization process processing the data read from the first addresses to determine a first minimum matrix element value and a first maximum matrix element value.

7. The method of clause 6, wherein said at least a first quantization subprocess further comprises a subprocess that uses the first minimum and maximum matrix element values to quantize the data read from the first addresses to produce a multi-bit matrix, wherein the multi-bit matrix comprises the first result forwarded by the second NCU to the host processor.

8. The method of clause 7, further comprising:
in the processor, performing a subprocess comprising performing convolution on the multi-bit matrix to produce a second result;
with the first NCU, forwarding the second result to the second NCU;
in the second NCU, receiving the second result and forwarding the second result to the processing circuit; and
in the processing circuit, performing a second quantization subprocess that processes the second result to determine a second minimum matrix element value and a second maximum matrix element value of the second result.

9. The method of clause 8, wherein the second quantization subprocess further comprises using the second minimum and maximum matrix element values to produce a second multi-bit matrix.

10. The method of any of clauses 1-9, wherein the host processor and the memory device are components of a system-on-a-chip (SoC) integrated circuit (IC) package of a portable computing device.

11. A system for performing energy-efficient computing by reducing data movement between a processor and a memory device that is external to the host processor, the system comprising:
a processor comprising logic configured to start at least a first process comprising at least a first subprocess;
a memory device comprising memory addresses configured to store data;
a first near data processing control unit (NCU) embedded in or in communication with the processor, the first NCU comprising logic configured to receive at least a first processing command and first addresses from the processor, said at least a first processing command comprising one or more commands for performing the first subprocess, the first addresses being addresses of the memory device at which data to be processed by the first subprocess is stored;
a second NCU disposed on or near the memory device and in communication with the first NCU, the second NCU comprising logic configured to receive the first addresses and the first commands from the first NCU; and
a processing circuit disposed on or near the memory device, the processing circuit comprising logic configured to receive the first commands and the first addresses from the second NCU and to read data from the first addresses and to perform the first commands on the data read from the first address to produce a first result.

12. The system of clause 11, wherein the processing circuit is further configured to store the first result at addresses of the memory device.

13. The system of clause 11, wherein the second NCU is further configured to send the first result to the first NCU, and wherein the first NCU is further configured to forward the first result to the processor, the processor being further configured to process the first result.

14. The system of any of clauses 11-13, wherein the first process comprises a tab switching process and said at least a first subprocess comprises a compression subprocess, the processing circuit being further configured to perform the compress subprocess to compress the data read from the first addresses to produce the first result.

15. The system of any of clauses 11-13, wherein the first process comprises a texture tiling process and said at least a first subprocess comprises a linear bitmap generation subprocess and a conversion subprocess, the processing circuit being further configured to perform the linear bitmap generation subprocess to process the data read from the first addresses to produce a linear bitmap and the conversion subprocess to process the linear bitmap to convert the linear bitmap into texture tiles.

16. The system of any of clauses 11-13, wherein the first process comprises a quantization and packing process and said at least a first subprocess comprises at least a first quantization subprocess, the processing circuit being configured to perform said at least a first quantization process to process the data read from the first addresses to determine a first minimum matrix element value and a first maximum matrix element value.

17. The system method of clause 16, wherein said at least a first quantization subprocess further comprises a subprocess that uses the first minimum and maximum matrix element values to quantize the data read from the first addresses to produce a multi-bit matrix, the processing circuit being further configured to perform the subprocess that uses the first minimum and maximum matrix element values to quantize the data read from the first addresses to produce a multi-bit matrix, and wherein the multi-bit matrix comprises the first result forwarded by the second NCU to the processor.

18. The system of clause 17, wherein the processor is further configured to perform a subprocess that comprises performing convolution on the multi-bit matrix to produce a second result, and wherein the first NCU is further configured to forward the second result to the second NCU, the second NCU being further configured to receive the second result and to forward the second result to the processing circuit, the processing circuit being further configured to perform a second quantization subprocess that processes the second result to determine a second minimum matrix element value and a second maximum matrix element value of the second result.

19. The system of clause 18, wherein the second quantization subprocess further comprises subprocess that uses the second minimum and maximum matrix element values to produce a second multi-bit matrix, the processing circuit being further configured to subprocess that uses the second minimum and maximum matrix element values to produce a second multi-bit matrix.

20. The system of clause 11, wherein the system is part of a system-on-a-chip (SoC) integrated circuit (IC) package of a portable computing device, and wherein the processing circuit, the second NCU and the memory device are part of a stacked dynamic random access (DRAM) memory system of the SoC IC package, the memory device comprising multiple stacked DRAM dies, the second NCU and the processing circuit being embedded in vault logic of a logic die of the stacked DRAM memory system.

21. A computer program comprising computer instructions for performing energy-efficient computing by reducing data movement between a processor and a memory device that is external to the processor, the computer instructions being embodied in a non-transitory computer-readable medium, the computer instructions comprising:
- a first set of computer instructions for execution by a processor for starting a first process comprising at least a first subprocess;
- a second set of computer instructions for execution by a first near data processing control unit (NCU) of the processor to cause the first NCU to output at least a first processing command for performing the first subprocess and first addresses of where data associated with the first subprocess is stored in the memory device;
- a third set of computer instructions for execution by a second NCU disposed on or near the memory device to cause the second NCU to receive said at least a first processing command and the first addresses and to cause the data stored at the first addresses to be read from the memory device and forwarded to a processing circuit disposed on or near the memory device; and
- a fourth set of computer instructions for execution by the processing circuit to cause the processing circuit to perform said at least a first subprocess by executing said at least a first processing command on the data read from the first addresses to produce a first result.

22. The computer program of clause 21, further comprising:
- a fifth set of computer instructions for execution by the processing circuit to cause the processing circuit to store the first result in the memory device.

23. The computer program of clause 21, further comprising:
- a fifth set of computer instructions for execution by the second NCU to cause the second NCU to send the first result to the first NCU;
- a sixth set of computer instructions for execution by the first NCU to cause the first NCU to forward the first result to the processor; and
- a seventh set of computer instructions for execution by the processor to cause the processor to process the first result.

24. The computer program of clause 21, wherein the first process comprises a tab switching process and said at least a first subprocess comprises a compression subprocess, the fourth set of computer instructions comprising instructions for compressing the data read from the first addresses to produce the first result.

25. The computer program of clause 21, wherein the first process comprises a texture tiling process and said at least a first subprocess comprises a linear bitmap generation subprocess and a conversion subprocess, the fourth set of computer instructions comprising computer instructions for processing the data read from the first addresses to produce a linear bitmap and computer instructions for processing the linear bitmap to convert the linear bitmap into texture tiles.

26. The computer program of clause 23, wherein the first process comprises a quantization and packing process and said at least a first subprocess comprises at least a first quantization subprocess, the fourth set of computer instructions comprising computer instructions for processing the data read from the first addresses to determine a first minimum matrix element value and a first maximum matrix element value.

27. The computer program of clause 26, wherein said at least a first quantization subprocess further comprises a subprocess that use the first minimum and maximum matrix element values to quantize the data read from the first addresses to produce a multi-bit matrix, the fourth set of computer instructions further comprising computer instructions that use the first minimum and maximum matrix element values to quantize the data read from the first addresses to produce the multi-bit matrix, wherein the multi-bit matrix comprises the first result forwarded by the second NCU to the host processor.

28. The computer program of clause 27, wherein the seventh set of computer instructions comprise computer instructions for performing convolution on the multi-bit matrix to produce a second result, and wherein the second set of computer instructions further comprise computer instructions for causing the first NCU to forward the second result to the second NCU, and wherein the third set of computer instructions further comprise computer instructions for causing the second NCU to receive the second result and forward the second result to the processing circuit, and wherein the fourth set of computer instructions comprise computer instructions for causing the processing circuit to perform a second quantization subprocess that processes the second result to determine a second minimum matrix element value and a second maximum matrix element value of the second result.

29. The computer program of clause 27, wherein the second quantization subprocess further comprises using the second minimum and maximum matrix element values to produce a second multi-bit matrix, and wherein the fourth set of computer instructions further comprise computer instructions for using the second minimum and maximum matrix element values to produce the second multi-bit matrix.

30. A system for performing energy-efficient computing by reducing data movement between a processor and a memory device that is external to the processor, the system comprising:
- a processor configured to start a first process comprising at least a first subprocess, the processor comprising logic configured to output at least a first processing command associated with performing the first subprocess and first addresses of where data associated with the first subprocess is stored in the memory device; and
- a processing circuit embedded in the memory device, the processing circuit comprising logic configured to receive the first processing command and the first addresses and to cause the data stored at the first addresses to be read from the memory device and forwarded to the processing circuit, the processing circuit comprising logic configured to performs said at least a first subprocess by performing said at least a first processing command on the data read from the first memory addresses to produce a first result.

Alternative embodiments will become apparent to one of ordinary skill in the art to which the invention pertains. Therefore, although selected aspects have been illustrated and described in detail, it will be understood that various substitutions and alterations may be made therein.

What is claimed is:
1. A method for performing energy-efficient computing by reducing data movement between a processor and a memory device that is external to the processor, the method comprising:
- with a processor, starting a first process comprising at least a first subprocess;
- with a first near data processing control unit (NCU) of the processor, outputting at least a first processing command associated with performing the first subprocess and first addresses of the memory device where data associated with the first subprocess is stored in the memory device;

with a second NCU disposed on or near the memory device, receiving the first processing command and the first addresses and causing the data stored at the first addresses to be read from the memory device and forwarded to a processing circuit disposed on or near the memory device; and in the processing circuit, performing said at least a first subprocess by performing said at least a first processing command on the data read from the first memory addresses to produce a first result;

wherein the first process comprises a texture tiling process and said at least a first subprocess comprises a linear bitmap generation subprocess and a conversion subprocess, the linear bitmap generation process processing the data read from the first addresses to produce a linear bitmap and the conversion subprocess processing the linear bitmap to convert the linear bitmap into texture tiles.

2. The method of claim 1, further comprising:
with the processing circuit, storing the first result in the memory device.

3. The method of claim 1, further comprising:
with the second NCU, sending the first result to the first NCU;
with the first NCU, forwarding the first result to the processor; and
in the processor, processing the first result.

4. The method of claim 1, wherein the first process comprises a tab switching process and said at least a first subprocess comprises a compression subprocess that compresses the data read from the first addresses to produce the first result.

5. The method of claim 3, wherein the first process comprises a quantization and packing process and said at least a first subprocess comprises at least a first quantization subprocess, said at least a first quantization process processing the data read from the first addresses to determine a first minimum matrix element value and a first maximum matrix element value.

6. The method of claim 5, wherein said at least a first quantization subprocess further comprises a subprocess that uses the first minimum and maximum matrix element values to quantize the data read from the first addresses to produce a multi-bit matrix, wherein the multi-bit matrix comprises the first result forwarded by the second NCU to the host processor.

7. The method of claim 6, further comprising:
in the processor, performing a subprocess comprising performing convolution on the multi-bit matrix to produce a second result;
with the first NCU, forwarding the second result to the second NCU;
in the second NCU, receiving the second result and forwarding the second result to the processing circuit; and
in the processing circuit, performing a second quantization subprocess that processes the second result to determine a second minimum matrix element value and a second maximum matrix element value of the second result.

8. The method of claim 7, wherein the second quantization subprocess further comprises using the second minimum and maximum matrix element values to produce a second multi-bit matrix.

9. The method of claim 1, wherein the host processor and the memory device are components of a system-on-a-chip (SoC) integrated circuit (IC) package of a portable computing device.

10. A system for performing energy-efficient computing by reducing data movement between a processor and a memory device that is external to the host processor, the system comprising:
a processor comprising logic configured to start at least a first process comprising at least a first subprocess;
a memory device comprising memory addresses configured to store data;
a first near data processing control unit (NCU) embedded in or in communication with the processor, the first NCU comprising logic configured to receive at least a first processing command and first addresses from the processor, said at least a first processing command comprising one or more commands for performing the first subprocess, the first addresses being addresses of the memory device at which data to be processed by the first subprocess is stored;
a second NCU disposed on or near the memory device and in communication with the first NCU, the second NCU comprising logic configured to receive the first addresses and the first commands from the first NCU; and
a processing circuit disposed on or near the memory device, the processing circuit comprising logic configured to receive the first commands and the first addresses from the second NCU and to read data from the first addresses and to perform the first commands on the data read from the first address to produce a first result;
wherein the first process comprises a texture tiling process and said at least a first subprocess comprises a linear bitmap generation subprocess and a conversion subprocess, the processing circuit being further configured to perform the linear bitmap generation subprocess to process the data read from the first addresses to produce a linear bitmap and the conversion subprocess to process the linear bitmap to convert the linear bitmap into texture tiles.

11. The system of claim 10, wherein the processing circuit is further configured to store the first result at addresses of the memory device.

12. The system of claim 10, wherein the second NCU is further configured to send the first result to the first NCU, and wherein the first NCU is further configured to forward the first result to the processor, the processor being further configured to process the first result.

13. The system of claim 10, wherein the first process comprises a tab switching process and said at least a first subprocess comprises a compression subprocess, the processing circuit being further configured to perform the compress subprocess to compress the data read from the first addresses to produce the first result.

14. The system of claim 12, wherein the first process comprises a quantization and packing process and said at least a first subprocess comprises at least a first quantization subprocess, the processing circuit being configured to perform said at least a first quantization process to process the data read from the first addresses to determine a first minimum matrix element value and a first maximum matrix element value.

15. The system method of claim 14, wherein said at least a first quantization subprocess further comprises a subprocess that uses the first minimum and maximum matrix element values to quantize the data read from the first addresses to produce a multi-bit matrix, the processing circuit being further configured to perform the subprocess that uses the first minimum and maximum matrix element values to quantize the data read from the first addresses to produce a multi-bit matrix, and wherein the multi-bit matrix comprises the first result forwarded by the second NCU to the processor.

16. The system of claim 15, wherein the processor is further configured to perform a subprocess that comprises performing convolution on the multi-bit matrix to produce a second result, and wherein the first NCU is further configured to forward the second result to the second NCU, the second NCU being further configured to receive the second result and to forward the second result to the processing circuit, the processing circuit being further configured to perform a second quantization subprocess that processes the second result to determine a second minimum matrix element value and a second maximum matrix element value of the second result.

17. The system of claim 16, wherein the second quantization subprocess further comprises subprocess that uses the second minimum and maximum matrix element values to produce a second multi-bit matrix, the processing circuit being further configured to subprocess that uses the second minimum and maximum matrix element values to produce a second multi-bit matrix.

18. The system of claim 10, wherein the system is part of a system-on-a-chip (SoC) integrated circuit (IC) package of a portable computing device, and wherein the processing circuit, the second NCU and the memory device are part of a stacked dynamic random access (DRAM) memory system of the SoC IC package, the memory device comprising multiple stacked DRAM dies, the second NCU and the processing circuit being embedded in vault logic of a logic die of the stacked DRAM memory system.

19. A computer program comprising computer instructions for performing energy-efficient computing by reducing data movement between a processor and a memory device that is external to the processor, the computer instructions being embodied in a non-transitory computer-readable medium, the computer instructions comprising:
  a first set of computer instructions for execution by a processor for starting a first process comprising at least a first subprocess;
  a second set of computer instructions for execution by a first near data processing control unit (NCU) of the processor to cause the first NCU to output at least a first processing command for performing the first subprocess and first addresses of where data associated with the first subprocess is stored in the memory device;
  a third set of computer instructions for execution by a second NCU disposed on or near the memory device to cause the second NCU to receive said at least a first processing command and the first addresses and to cause the data stored at the first addresses to be read from the memory device and forwarded to a processing circuit disposed on or near the memory device; and
  fourth set of computer instructions for execution by the processing circuit to cause the processing circuit to perform said at least a first subprocess by executing said at least a first processing command on the data read from the first addresses to produce a first result;
  wherein the first process comprises a texture tiling process and said at least a first subprocess comprises a linear bitmap generation subprocess and a conversion subprocess, the fourth set of computer instructions comprising computer instructions for processing the data read from the first addresses to produce a linear bitmap and computer instructions for processing the linear bitmap to convert the linear bitmap into texture tiles.

20. The computer program of claim 19, further comprising:
  a fifth set of computer instructions for execution by the processing circuit to cause the processing circuit to store the first result in the memory device.

21. The computer program of claim 19, further comprising:
  a fifth set of computer instructions for execution by the second NCU to cause the second NCU to send the first result to the first NCU;
  a sixth set of computer instructions for execution by the first NCU to cause the first NCU to forward the first result to the processor; and
  a seventh set of computer instructions for execution by the processor to cause the processor to process the first result.

22. The computer program of claim 19, wherein the first process comprises a tab switching process and said at least a first subprocess comprises a compression subprocess, the fourth set of computer instructions comprising instructions for compressing the data read from the first addresses to produce the first result.

23. The computer program of claim 21, wherein the first process comprises a quantization and packing process and said at least a first subprocess comprises at least a first quantization subprocess, the fourth set of computer instructions comprising computer instructions for processing the data read from the first addresses to determine a first minimum matrix element value and a first maximum matrix element value.

24. The computer program of claim 23, wherein said at least a first quantization subprocess further comprises a subprocess that use the first minimum and maximum matrix element values to quantize the data read from the first addresses to produce a multi-bit matrix, the fourth set of computer instructions further comprising computer instructions that use the first minimum and maximum matrix element values to quantize the data read from the first addresses to produce the multi-bit matrix, wherein the multi-bit matrix comprises the first result forwarded by the second NCU to the host processor.

25. The computer program of claim 24, wherein the seventh set of computer instructions comprise computer instructions for performing convolution on the multi-bit matrix to produce a second result, and wherein the second set of computer instructions further comprise computer instructions for causing the first NCU to forward the second result to the second NCU, and wherein the third set of computer instructions further comprise computer instructions for causing the second NCU to receive the second result and forward the second result to the processing circuit, and wherein the fourth set of computer instructions comprise computer instructions for causing the processing circuit to perform a second quantization subprocess that processes the second result to determine a second minimum matrix element value and a second maximum matrix element value of the second result.

26. The computer program of claim 25, wherein the second quantization subprocess further comprises using the second minimum and maximum matrix element values to produce a second multi-bit matrix, and wherein the fourth set of computer instructions further comprise computer instructions for using the second minimum and maximum matrix element values to produce the second multi-bit matrix.

27. A system for performing energy-efficient computing by reducing data movement between a processor and a memory device that is external to the processor, the system comprising:
- a processor configured to start a first process comprising at least a first subprocess, the processor comprising logic configured to output at least a first processing command associated with performing the first subprocess and first addresses of the memory device where data associated with the first subprocess is stored in the memory device; and
- a processing circuit embedded in the memory device, the processing circuit comprising logic configured to receive the first processing command and the first addresses and to cause the data stored at the first addresses to be read from the memory device and forwarded to the processing circuit, the processing circuit comprising logic configured to perform said at least a first subprocess by performing said at least a first processing command on the data read from the first memory addresses to produce a first result;

wherein the first process comprises a texture tiling process and said at least a first subprocess comprises a linear bitmap generation subprocess and a conversion subprocess, the processing circuit comprising logic being further configured to perform the linear bitmap generation subprocess to process the data read from the first addresses to produce a linear bitmap and the conversion subprocess to process the linear bitmap to convert the linear bitmap into texture tiles.

* * * * *